United States Patent
Darling et al.

(10) Patent No.: US 8,048,581 B2
(45) Date of Patent: Nov. 1, 2011

(54) PEM FUEL CELL SYSTEM WITH A POROUS HYDROPHOBIC GAS VENTING MEMBER WITH GAS FLOW BLOCKAGE PREVENTION

(75) Inventors: Robert Darling, South Windsor, CT (US); Craig E. Evans, Portland, OR (US)

(73) Assignee: VTC Power Corporation, So. Windsor, CT (US)

( * ) Notice: Subject to any disclaimer, the term of this patent is extended or adjusted under 35 U.S.C. 154(b) by 372 days.

(21) Appl. No.: 12/312,294

(22) PCT Filed: Dec. 16, 2006

(86) PCT No.: PCT/US2006/048195
§ 371 (c)(1),
(2), (4) Date: May 5, 2009

(87) PCT Pub. No.: WO2008/076107
PCT Pub. Date: Jun. 26, 2008

(65) Prior Publication Data
US 2010/0047629 A1  Feb. 25, 2010

(51) Int. Cl.
*H01M 8/04* (2006.01)
*H01M 8/00* (2006.01)

(52) U.S. Cl. ........ 429/437; 429/433; 429/434; 429/450; 429/535

(58) Field of Classification Search .................. 429/433, 429/434, 437, 450, 535
See application file for complete search history.

(56) References Cited

U.S. PATENT DOCUMENTS
6,015,634 A * 1/2000 Bonville et al. ............... 429/415
2003/0232228 A1 * 12/2003 Grasso ............................ 429/26

FOREIGN PATENT DOCUMENTS
FR         2 837 025       9/2003
WO         WO 0128016      4/2001
WO         WO 2004/004046  1/2004
WO         WO 2006/071580  7/2006

* cited by examiner

*Primary Examiner* — Yogendra Gupta
*Assistant Examiner* — Jeremiah Smith
(74) *Attorney, Agent, or Firm* — Andrew Gathy

(57) ABSTRACT

A polymer electrolyte membrane (PEM) fuel cell power plant is cooled evaporatively with a water coolant system which does not permit liquid water to exit or flow through the coolant system. The coolant system utilizes a hydrophobic porous member (28) for venting gases such as fuel and/or air from a coolant water flow field in the system. Coolant water (36) is prevented from continuosly contacting the porous member during operation of the power plant thus preventing blockage of the porous member by coolant water or contaminants disposed in the coolant water.

18 Claims, 3 Drawing Sheets

PEM FUEL CELL SYSTEM WITH A POROUS HYDROPHOBIC GAS VENTING MEMBER WITH GAS FLOW BLOCKAGE PREVENTION

TECHNICAL FIELD

The present disclosure relates to a polymer electrolyte membrane (PEM) fuel cell power plant which is cooled evaporatively by an aqueous coolant that does not exit the cell in a liquid phase. More particularly, this disclosure relates to a coolant system of the character described which utilizes a hydrophobic porous gas venting member for maintaining coolant exit pressure in a coolant flow field in the system and a coolant water level sensor mechanism for preventing the coolant water from continuously contacting the porous member.

BACKGROUND OF THE DISCLOSURE

Polymer electrolyte membrane fuel cell assemblies are relatively low temperature low operating pressure fuel cell assemblies that utilize a catalyzed polymer electrolyte membrane (PEM) to process air and a hydrogen-rich fuel to produce electricity and water. PEM fuel cells are well suited for use in mobile applications such as automobiles, buses, and the like, because they are relatively compact, light in weight and can be operated at essentially ambient pressure.

These types of fuel cells can be cooled by means of a water coolant which does not exit the cells in a liquid phase. During the cooling operation, water will pass from a coolant flow field through porous plate components of the cells and may pass through the electrolyte membrane where it will evaporate into the air stream in the active area of the cells. The water thus keeps the membranes moist and also cools the cells. During the cooling operation, small amounts of gases such as air and fuel can also pass through the porous plates into the coolant flow field. It is desirable to remove the diffused air and fuel from the water coolant so that the coolant will not be diluted and its cooling capability and its ability to prevent the porous bodies in the cell from drying will not be degraded. The air and fuel gas removal operation must be performed while preventing the coolant water from escaping from the coolant flow field.

We have devised a gas venting structure and method for effectively removing the air and fuel from the coolant while maintaining a proper exit pressure in the coolant flow field, and preventing the water coolant from escaping from the coolant flow field. Our structure and method also prevents coolant water or impurities therein from plugging or otherwise blocking the venting structure during operation of the power plant

SUMMARY

This disclosure relates to a PEM fuel cell power plant having hydrophobic porous member components which allow gas in the coolant flow fields to leave without removing water from the coolant flow fields. The members ensure the maintenance of proper pressure whereby gases in the coolant flow fields will be purged therefrom through the members, while liquid coolant will be prevented from migrating through the members from the coolant flow fields. Coolant migration is prevented by monitoring the level of the coolant water in the coolant flow field and preventing the coolant water from directly contacting the members. This ensures that coolant water or contaminants in the coolant cannot block or plug the venting members during operation of the power plant.

The fuel cell power plant includes a conventional catalyzed polymer membrane electrode having an anode side which receives a hydrogen-rich fuel stream and a cathode side which receives an oxygen-containing reactant stream. A cooling flow field is disposed in heat exchange relationship with the cathode or anode side so as to cool the fuel cell during operation thereof. The coolant used in the system. is typically water. The coolant in the cooling flow field does not circulate through the fuel cell assembly in a liquid state as the cooling is accomplished by evaporation of the liquid coolant into the air stream in the cathode flow field. Air and other gases which may enter the water in the coolant flow field are purged from the water coolant in the coolant flow field through the porous members which pass the gases there through. Plugging of the porous members by the coolant water or impurities therein is prevented by intermittently interrupting a vacuum which is applied to the members to draw the gases through the members. The vacuum is interrupted when the level of coolant water rises to a certain predetermined level in the coolant flow field.

BRIEF DESCRIPTION OF THE DRAWINGS

Certain objects and advantages of this disclosure will become more readily apparent to one skilled in the art from the following detailed description of a preferred embodiment of the disclosure when taken in conjunction with the accompanying drawings in which.

DETAILED DESCRIPTION OF THE DISCLOSURE

Figure 1:
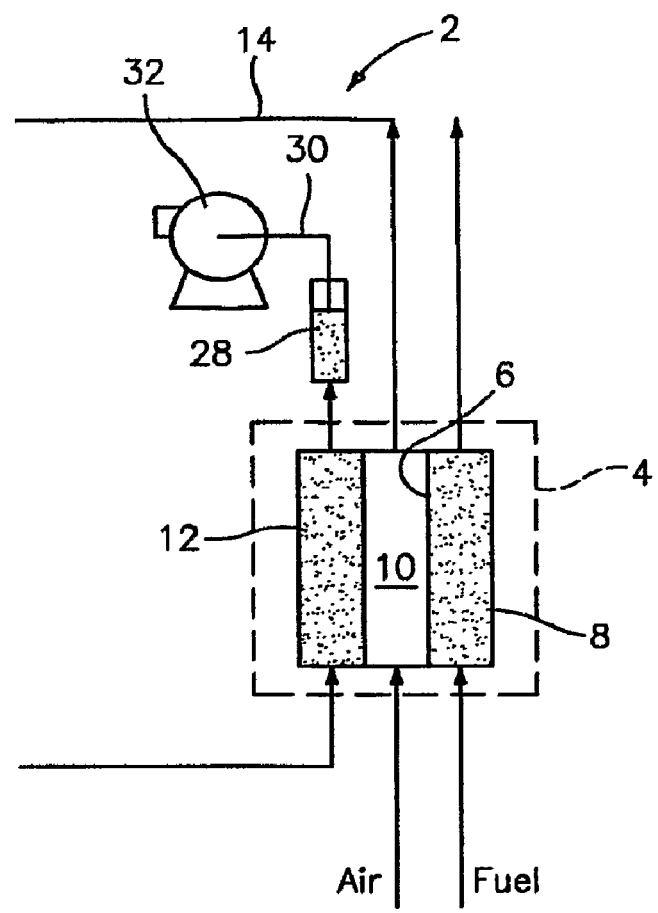
FIG. 1 is a schematic view of a portion of a PEM fuel cell assembly which is used in a power plant formed in accordance with this disclosure.
Figure 2:
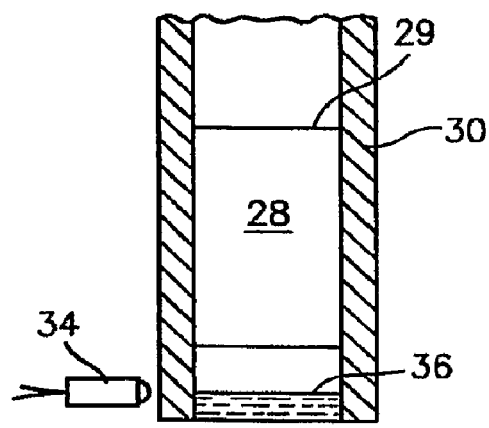
FIG. 2 is a fragmented axial. sectional view of a gas exhaust assembly which has a hydrophobic porous member positioned therein for use in the fuel cell assembly of FIG. 1.

Referring now to the drawings, FIG. 1 is a schematic view of a portion of a PEM cell operating system, denoted generally by the numeral 2, of a fuel cell power plant formed in accordance with this disclosure. The fuel cell 4 includes a catalyzed polymer electrolyte membrane 6 which is interposed between a fuel reactant flow field 8 (the anode side) and an oxidant reactant flow field 10 (the cathode side). A coolant flow field 12 is disposed adjacent to the anode or cathode side 8 or 10 of the fuel cell 4. The coolant flow field 12 contains a non-circulating liquid coolant, preferably water, that does not exit the cell in a liquid state, and that serves to evaporatively cool the active area of the PEM cell subassembly 2 so as to maintain the proper operating temperature of the fuel cell 4. The coolant flow field 12 is of conventional construction for evaporative cooling of the anode or cathode side of the fuel cell 4. The coolant flow field 12 may include a grid-like coolant channel (which can be formed in either an anode or cathode flow field porous plate) through which the coolant passes from an inlet end to an outlet end of the coolant flow field 12. The innermost wall of the coolant flow field 12 is formed from one wall of the anode side 8 or cathode side 10 of the fuel cell 4 and is formed from a porous material so that coolant water can pass through the porous wall into the fuel or air stream in the anode or cathode side of the fuel cell 4. The coolant water that passes into the fuel or air stream will finally vaporize in the air stream thus cooling the cell 4. At the same time, a small amount of fuel or air from the anode and/or cathode of the cell will enter into the water coolant in the coolant flow field.

During the reaction, the hydrogen in the fuel and the oxygen in the air are converted into protons, mobile electrons and water. The reaction product water is formed in the air stream in the cathode side 10 of the cell 4 and is removed, along with residual air and the evaporated coolant water, as cathode effluent through a line 14. The coolant flow field 12 is kept under a lower pressure than fuel and air by an optional vacuum pump 32 at its outlet end. This pump 32 is connected to the coolant flow field 12 through a line 30. A porous member 28 which is at least partially hydrophobic, is disposed between the line 30 in the flow field 12 and the vacuum pump 32. The vacuum pump 32, when employed, will draw any gases, such as air and/or hydrogen, which may be present in the coolant flow field 12 out of the coolant flow field 12 through the porous member 28. The pores and the thickness of the member 28 are sized so as to allow passage of gases through the member 28. Gases drawn out of the coolant flow field 12 are then vented to the ambient surroundings. The porous member 28 can be made at least partially from an open weave TEFLON (tetrafluoroethylene) or the like hydrophobic material.

There is a possibility that coolant water from the coolant flow field 12 may continuously directly contact the porous member 28 and thus interfere with gases passing through the member 28. This problem is avoided by having a coolant water level detection device 34 positioned adjacent to the line 30 below the member 28 so that the device 34 can detect a particular position of the upper level 36 of the coolant water in the line 30 during operation of the power plant. The device 34 can take the form of a conductivity sensor, a float, an ultra sonic sensor, or a capacitance sensor, for example. All of the devices are commercially available sensors. It will be appreciated that if the sensor used were a conductivity sensor, then the leads for the sensor would be changed to gold to prevent corrosion of the leads. If the specific sensor utilized requires electrical power, this power can be derived from an adjunct dry cell battery or from the power produced by the fuel cell power plant.

The purpose of the device 34 is to prevent the coolant water upper end from directly continuously contacting the member 28 such that the coolant water could block gas flow through the member 28. When the coolant water surface 36 rises to a level which can be detected by the device 34, the device 34 will be operative to negate or partially diminish the vacuum which is created by the vacuum pump 32. This can be accomplished by interrupting the power supply to the pump 32, by throttling the vacuum created by the pump 32 by means of a throttling valve 16, or by slowing down the pump 32.

Figure 3:
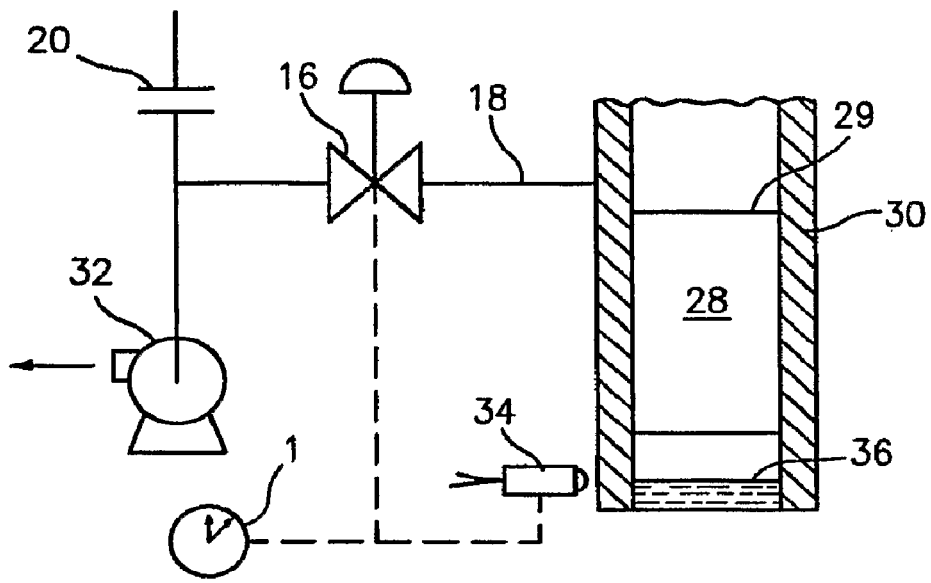
FIG. 3 is a view similar to FIG. 2 but showing a first embodiment of a specific water level control system for use with the disclosure.
Figure 4:
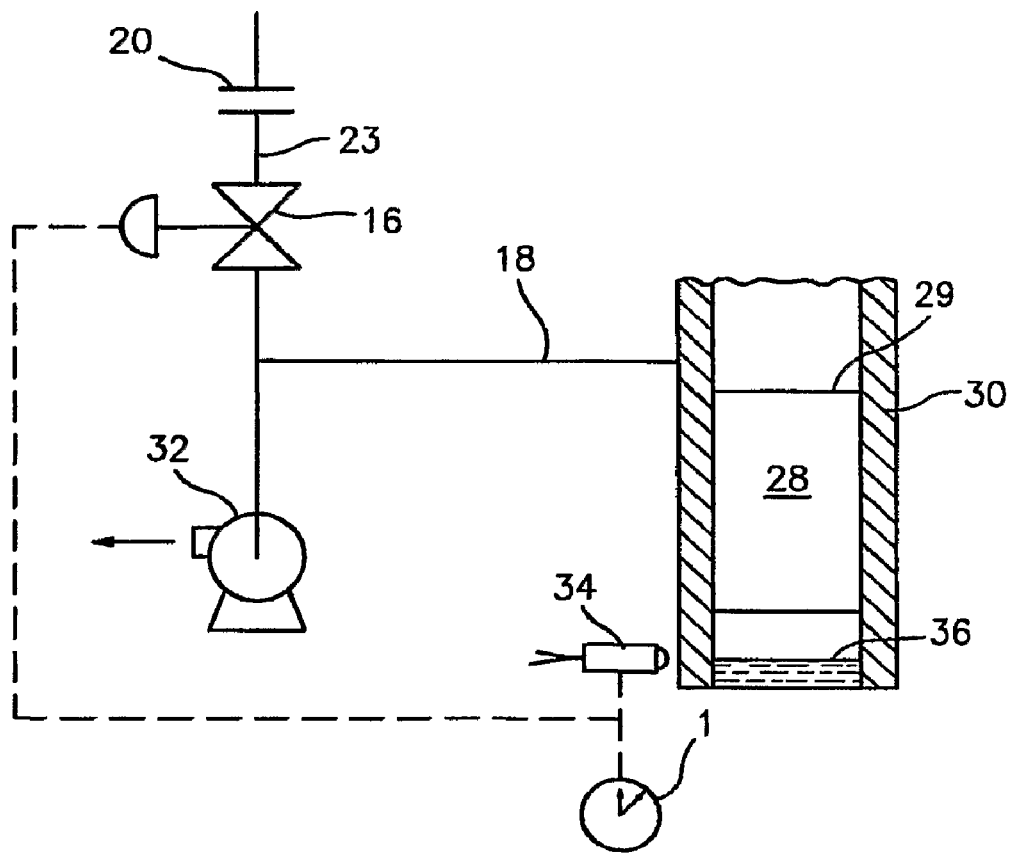
FIG. 4 is a view similar to FIG. 3 but showing a second embodiment of a water level control system.

FIGS. 3 and 4 illustrate two sub-systems for varying or throttling the vacuum created by the vacuum pump 32. In the system illustrated in FIG. 3, a line 18 connects the interior of the flow field assembly 30 above the member 28 with the vacuum pump 32. A valve 16 which can be opened is disposed in the line so as to be able to control the passage of air through the line 18 from the tube 30 to the pump 32. The valve 16 is connected to the sensor 34 so that the sensor 34 can control the valve 16. When the sensor 34 detects the water level 36, it will cause the valve 16 to close or partially close so as to reduce the vacuum in the line 18 and the assembly 29 thereby reducing the suction force acting on the water. This will allow the water level 36 to decline to a level which cannot be detected by the sensor 34 whereupon the valve 16 can be reopened to increase the vacuum in the line 18. The valve 16 can be controlled by a timer 1 in the manner described hereinafter. Thus, in this embodiment the valve 16 is opened to draw the water level 36 up and is closed to let the water level 36 fall. This embodiment may also include an air flow orifice 20. Pulling air through the orifice 20 with the vacuum pump 32 will cause a desired vacuum pressure.

In the system illustrated in FIG. 4, the valve 16 is located in a line 23 and the vacuum line 18 connects with the line 23 between the valve 16 and the vacuum pump 32. The vacuum in the exit assembly 30 is increased by closing the valve 16, or throttling it, and the vacuum in the exit assembly 30 is decreased by opening the valve 16. Operation of the valve 16 is controlled by signals from the coolant level sensor 34.

Figure 5:
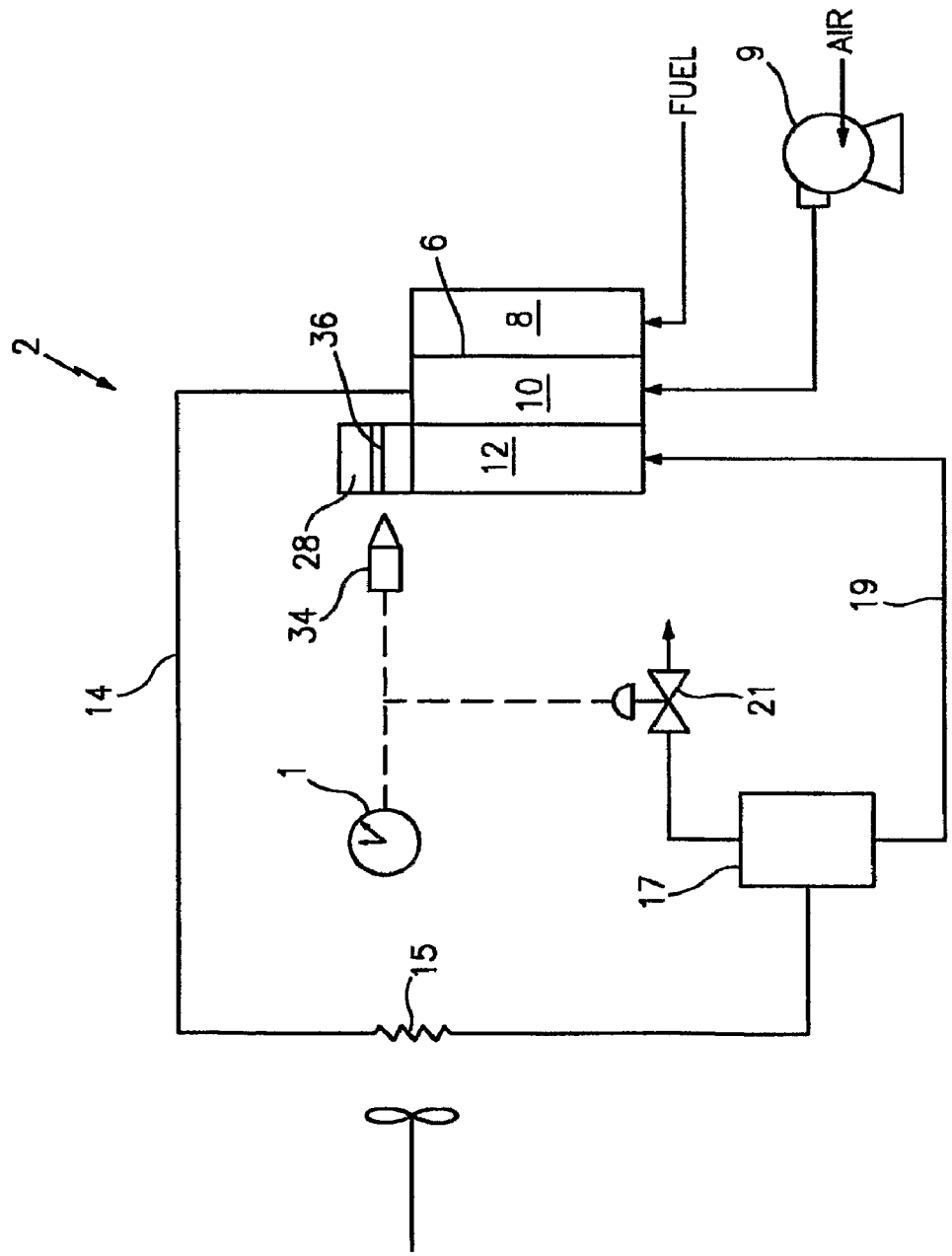
FIG. 5 is a schematic view of a pressurized version of a PEM fuel cell assembly which is used in power plant formed in accordance with this disclosure.

Referring now to FIG. 5, there is shown a pressurized version of a PEM fuel cell operating system 2 which operates with the same general principals as those described above. The fuel cell includes the electrolyte membrane 6, the anode reactant flow field 8. the cathode flow field 10 and the coolant flow field 12. The system is pressurized by means of a compressor 9 which pressurizes air fed into the cathode flow field 10 and thus pressurizes the air and coolant systems. The fuel pressure is controlled separately. The air reactant will pick up both product water and coolant water moisture as it passes through the cathode flow field 10 and into the cathode effluent line 14. The moisturized cathode effluent flows through the line 14 to a condenser 15 where the water content of the effluent is condensed out of the air in the effluent. The effluent stream then passes through a water-air separator 17 where most of the liquid water is separated from the air, with the water settling to the lower portion of the separator 17 and flowing through a line 19 back into the coolant flow field 12. The separated air component moves into a line that is connected to a valve 21 which can be selectively opened and closed. When the valve 21 remains closed, pressure in the system 2 is elevated by the compressor 9. The elevated pressure causes the water to move through the line 19 into the coolant flow field 12. The coolant water then rises through the coolant flow field to a level indicated by the numeral 36. The porous member 28 is positioned in the coolant flow field outlet and the sensor 34 is positioned as previously described so as to be able to detect the position of the coolant water level 36. When the sensor 34 detects the presence of the coolant water level it will operate to open the valve 21 to ambient pressure so as to lower the pressure in the system 2 whereupon the coolant water level will recede so that it will no longer be detected by the sensor 34. The valve 21 can be controlled by a timer 1 as described hereinafter. When the water level 36 is no longer detected, the sensor 34 will close the valve 21 so as to increase the internal pressure in the system 2. The cycle of opening and closing the valve 21 will be repeated as often as necessary so as to prevent the coolant water from remaining in sustained contact with the porous member 28. The gas venting porous member 28 will thus be protected against being blocked by the coolant water or by contaminants that are in the coolant water. The system shown in FIG. 5 can also include the timer(s) 1 as shown.

The system can be operated as follows. Water is forced up in the fuel cell stack by the pump 32 or by the compressor 9. Once the water level 36 reaches the sensor 34, the valves 16 or 21 are opened so as to lower the pressure on the coolant water, whereby the water level 36 will recede. At the same time the timer 1 can be set so that the valves 16 or 21 will reclose after two seconds or some other predetermined time interval. After a predetermined period of time, for example two seconds, the timer 1 will cause the valve 16 or 21 to reclose so as to increase the vacuum or positive pressure so as to cause the water level 36 to rise to a position where it will again be detected by the sensor 34. This cycle then repeats itself. The aforesaid timer creates hysteresis so as to prevent the vacuum pump or compressor from cycling too much due to system noise or splashing water.

It will be readily appreciated that the system of this disclosure will ensure proper removal of gases from the coolant stream while avoiding the problem of liquid or dissolved contaminant blockage of the gas venting member in the system which can be caused by direct contact between coolant water and the gas venting member. The system can operate either with an internal negative pressure being established which is selectively periodically lowered and subsequently reestablished, or with an internal positive pressure being established which is selectively periodically lowered and subsequently reestablished.

Since many changes and variations of the disclosed embodiment of the disclosure may be made without departing from the inventive concept, it is not intended to limit the disclosure otherwise than as required by the appended claims.

What is claimed is:

1. A system for removing gases from an aqueous coolant flow field in a PEM fuel cell power plant, said system comprising: a) an aqueous coolant flow field containing a non-circulating liquid coolant; b) a vacuum pump at an outlet end of said aqueous coolant flow field adapted to draw gases from said coolant into said outlet end of said coolant flow field ; c) a gas-permeable member disposed in said outlet end of said coolant flow field, said member being operative to pass gases from said coolant to ambient surroundings ; d) a sensor configured to detect a coolant level in said outlet end of said flow field; and e) means for selectively reducing said vacuum responsive to detection of the coolant level in said outlet end of said flow field so as to prevent said coolant from contacting said member.

2. The system of claim 1 further comprising means for selectively increasing said vacuum when said sensor no longer detects the coolant level in said outlet end of said flow field.

3. The system of claim 2 further comprising timer means for timing the increasing of said vacuum after detection of the coolant level by said sensor.

4. The system of claim 1 wherein said means for forming a vacuum is a vacuum pump which forms the vacuum at an outlet end of said gas-permeable member.

5. The system of claim 1 wherein said means for selectively reducing is a valve.

6. The system of claim 5 wherein said valve is opened to reduce said vacuum and is closed to increase said vacuum.

7. The system of claim 5 wherein said valve is dosed to reduce said vacuum and is opened to increase said vacuum.

8. A method for removing gases from an aqueous coolant flow field in a PEM fuel cell power plant, said method comprising: a) the step of providing an aqueous coolant flow field containing a non-circulating liquid coolant; b) the step of forming a vacuum at an outlet end of said aqueous coolant flow field so as to draw gases from said coolant into said outlet end of said coolant flow field ; c) the step of passing said drawn gases through a gas-permeable member disposed at said outlet end of said coolant flow field, said member being operative to pass gases from said coolant to ambient surroundings; d) the step of sensing the coolant level in said outlet end of said flow field; and e) the step of selectively reducing said vacuum when said coolant level is sensed in said outlet end of said flow field so as to prevent said coolant from contacting said member.

9. The method of claim 8 further comprising the step of selectively increasing said vacuum when said coolant level is no longer sensed in said outlet end of said flow field.

10. The method of claim 9 further comprising the step of timing the reduction and increasing of said vacuum relative to the detection of the coolant level.

11. The method of claim 8 wherein said step of forming a vacuum is performed by a vacuum pump which forms the vacuum at an outlet end of said gas-permeable member.

12. The method of claim 8 wherein said step of reducing is performed by a valve which can be opened or closed to reduce said vacuum.

13. The method of claim 12 wherein said valve is opened to reduce said vacuum and is closed to increase said vacuum.

14. The method of claim 12 wherein said valve is closed to reduce said vacuum and is opened to increase said vacuum.

15. A system for removing gases from an aqueous coolant flow field in a PEM fuel cell power plant, said system comprising: a) an aqueous coolant flow field containing a non-circulating liquid coolant and having an inlet end and an outlet end; b) means for creating a pressure differential between said inlet end and said outlet end of said coolant flow field whereby the pressure at said inlet end is greater than the pressure at said outlet end; c) a gas-permeable member disposed in said outlet end of said coolant flow field, said member being operative to pass gases from said coolant to ambient surroundings; d) a sensor configured to detect a coolant level in said outlet end of said flow field; and e) means for selectively reducing said pressure differential responsive to detection of the coolant level in said outlet end of said flow field so as to prevent said coolant from contacting said member.

16. The system of claim 15 wherein said pressure differential is created by a vacuum pump operatively connected to said outlet end of said coolant flow field.

17. The system of claim 15 wherein said pressure differential is created by a compressor operatively connected to said inlet end of said coolant flow field.

18. The system of claim 15 wherein said means for selectively reducing said pressure differential is a valve which can be selectively opened and closed.

* * * * *

UNITED STATES PATENT AND TRADEMARK OFFICE
CERTIFICATE OF CORRECTION

PATENT NO. : 8,048,581 B2
APPLICATION NO. : 12/312294
DATED : November 1, 2011
INVENTOR(S) : Robert Darling et al.

Page 1 of 1

It is certified that error appears in the above-identified patent and that said Letters Patent is hereby corrected as shown below:

Title page, in item "(73) Assignee:", "VTC" should be --UTC--.

Signed and Sealed this
Twelfth Day of July, 2016

Michelle K. Lee
*Director of the United States Patent and Trademark Office*